UNITED STATES PATENT OFFICE 2,447,479

SEPARATION OF ETHYL BENZENE FROM XYLENES

Francis Edward Salt, Banstead, England, assignor to The Distillers Company, Limited, Edinburgh, Scotland, a British company No Drawing. Application October 16, 1946, Serial No. 703,491. In Great Britain October 22, 1945

7 Claims. (Cl. 260—674)

This invention relates to a process of preparing a concentrated solution of ethyl benzene in hydrocarbons from dilute solutions of ethyl benzene in other hydrocarbons, which process is especially useful for the treatment of hydrocarbon distillates such as are obtained in the petroleum industry.

Ethylbenzene is frequently found in hydrocarbon distillates, for instance, those resulting in the petroleum industry, in association with xylenes, especially m-xylene, and other hydrocarbons chiefly of a non-aromatic nature. The separation of ethyl-benzene from the accompanying hydrocarbons or its concentration therein, by fractional distillation, meets with considerable difficulties owing to the closeness of the boiling points of ethyl benzene and the xylenes.

According to the present invention, there is provided a process for the separation of ethylbenzene from, or its concentration in, hydrocarbon mixtures comprising ethylbenzene and an isomeric xylene which comprises reacting said isomeric xylene with di(alpha-chloroethyl) ether at a temperature between —15° C. and +15° C. in the presence of zinc chloride whilst limiting the water content of the mixture to a value not exceeding 50% by weight of the zinc chloride used and thereafter subjecting the reaction mixture to fractional distillation. The temperature of the reaction mixture is preferably maintained below 10° C. and is most advantageously maintained in the neighbourhood of 0° C. As the boiling points of the chloroethylated xylene compounds differ considerably from that of ethylbenzene, a concentration of the latter compound can be easily achieved by fractionation.

The chloroethylation process may alternatively be effected by adding acetaldehyde and zinc chloride to the mixture of ethylbenzene and other hydrocarbons and passing hydrogen chloride, preferably in a dry state, through the mixture or by passing hydrogen chloride through a solution of acetaldehyde in the ethylbenzene-containing hydrocarbon mixture, separating off the water formed, and then treating the remaining reaction mixture with zinc chloride whilst, in either case, maintaining the reaction mixture at the temperatures stated above and keeping the water content thereof to below the limit stated. When operating the process by either of the alternative ways just indicated, the di(alpha-chloroethyl) ether is apparently first formed in situ and then condenses with the xylene. Instead of acetaldehyde, substances, such as paraldehyde, decomposable under the reaction conditions to yield acetaldehyde, may be used.

The ethylbenzene remains unaffected by the described chloroethylation processes, whereas the m-xylene present is substantially converted into the chloroethylated compounds.

The following example illustrates the manner in which the invention may be carried into effect.

A mixture of ethylbenzene and m-xylene containing 174 g. of ethylbenzene and 106 g. m-xylene is mixed with 30 g. of powdered anhydrous zinc chloride and treated with dry hydrogen chloride at 0° C. 44 g. of paraldehyde were added over a period of half an hour after which the reaction mixture was stirred for a further 3½ hours. During the whole of the time the mixture was agitated and maintained at about 0° C. while, during the addition of the paraldehyde, a slow stream of hydrogen chloride was passed in. The reaction product consisted of two layers; the lower aqueous layer was separated off and the upper layer was washed with ice-water until free from hydrochloric acid and zinc chloride, dried and fractionally distilled in vacuo.

The lower-boiling fraction consisted of ethylbenzene and unreacted m-xylene—the concentration of ethylbenzene in this being 81% by weight as compared with 62% by weight in the starting material. A higher boiling fraction consisting of alpha-chloroethyl m-xylene was collected, the yield of this being 54% of the theoretical based on the paraldehyde used.

A process for the chlorethylation of polymethyl-substituted benzenes by the action of di(alpha-chloroethyl) ether is described and claimed in copending U. S. application Serial No. 703,706, filed October 17, 1946.

What I claim is:

1. A process for the concentration of ethylbenzene in hydrocarbon mixtures comprising ethylbenzene and an isomeric xylene which comprises the steps of reacting the isomeric xylene in said mixture with di(alpha-chloroethyl) ether at a temperature between —15° C. and +15° C. in the presence of zinc chloride whilst limiting the water content of the mixture to a value not exceeding 50% by weight of the zinc chloride used and thereafter subjecting the reaction mixture to fractional distillation.

2. A process for the concentration of ethylbenzene in hydrocarbon mixtures comprising ethylbenzene and an isomeric xylene which comprises the steps of reacting the isomeric xylene in said mixture with di(alpha-chloroethyl) ether at a temperature in the neighbourhood of 0° C.

in the presence of zinc chloride whilst limiting the water content of the mixture to a value not exceeding 50% by weight of the zinc chloride used and thereafter subjecting the reaction mixture to fractional distillation.

3. A process for the concentration of ethylbenzene in hydrocarbon mixtures comprising ethylbenzene and an isomeric xylene which comprises adding acetaldehyde to said hydrocarbon mixture and passing gaseous hydrogen chloride into said mixture in the presence of zinc chloride at a temperature between —15° C. and +15° C. whilst limiting the water content of the mixture to a value not exceeding 50% by weight of the zinc chloride used and thereafter subjecting the reaction mixture to fractional distillation.

4. A process for the concentration of ethylbenzene in hydrocarbon mixtures comprising ethylbenzene and an isomeric xylene which comprises adding paraldehyde to said hydrocarbon mixture and passing gaseous hydrogen chloride into said mixture at a temperature between —15° C. and +15° C., separating off formed water, treating the residual reaction mixture with zinc chloride whilst maintaining a temperature between —15° C. and +15° C. and whilst limiting the water content of the mixture to a value not exceeding 50% by weight of the zinc chloride used and thereafter subjecting the reaction mixture to fractional distillation.

5. A process for the concentration of ethylbenzene in a mixture thereof with at least one isomeric xylene which comprises the steps of adding zinc chloride to said mixture, treating it with dry hydrogen chloride gas at a temperature of about 0° C., adding paraldehyde gradually to said mixture whilst stirring and maintaining a temperature of about 0° C., continuing to feed a slow stream of hydrogen chloride gas into the reaction mixture during the addition of said paraldehyde, thereafter stirring to allow the reaction to be completed whilst still at a temperature of about 0° C., separating off the lower aqueous layer, washing the upper hydrocarbon layer to free it from hydrochloric acid and zinc chloride, drying, distilling in vacuo to recover a lower-boiling fraction containing ethylbenzene and some unreacted xylene and to leave a residue of the alpha-chloroethyl xylene.

6. A process for the concentration of ethylbenzene in a mixture thereof with at least one isomeric xylene which comprises the steps of adding zinc chloride to said mixture, treating it with dry hydrogen chloride gas at a temperature of about 0° C., adding acetaldehyde gradually to said mixture whilst stirring and maintaining a temperature of about 0° C., continuing to feed a slow stream of hydrogen chloride gas into the reaction mixture during the addition of said acetaldehyde, thereafter stirring to allow the reaction to be completed whilst still at a temperature of about 0° C., separating off the lower aqueous layer, washing the upper hydrocarbon layer to free it from hydrochloric acid and zinc chloride, drying, and distilling in vacuo to recover a lower-boiling fraction containing ethylbenzene and some unreacted xylene and to leave a residue of the alpha-chloroethyl xylene.

7. A process for the concentration of ethyl benzene in hydrocarbon mixtures comprising ethyl benzene and an isomeric xylene which comprises the steps of reacting the isomeric xylene in said mixture with a material selected from the group consisting of di(alpha-chloroethyl) ether and a mixture of one of the compounds of the group consisting of acetaldehyde and compounds decomposable under the reaction conditions to acetaldehyde, and hydrogen chloride, which mixture reacts under the reaction conditions to form di(alpha-chloroethyl) ether in situ, at a temperature between —15° C. and +15° C. in the presence of zinc chloride, whilst limiting the water content of the mixture to a value not exceeding 50% by weight of zinc chloride used and thereafter subjecting the reaction mixture to fractional distillation.

FRANCIS EDWARD SALT.

REFERENCES CITED

The following references are of record in the file of this patent:

FOREIGN PATENTS

| Number | Country | Date |
| --- | --- | --- |
| 787,655 | France | July 8, 1935 |

OTHER REFERENCES

Vavon et al., Bull. Soc. Chim. de France Ser. 5, vol. 6 1025–1031 (1939).

Adams et al., Organic Reactions Pub. by John Wiley and Sons, Inc. New York, vol. 1, 64–73 (1942).